US005670928A

United States Patent [19]

Cheng et al.

[11] Patent Number: 5,670,928

[45] Date of Patent: Sep. 23, 1997

[54] FUSE BOX

[76] Inventors: Wen-Tzung Cheng, No. 422, Fu-Hsing Rd.; Wen-Huoh Cheng, No. 424, Fu-Hsing Rd., both of Tao Yuan City, Tao Yuan Hsien, Taiwan

[21] Appl. No.: 778,076

[22] Filed: Jan. 2, 1997

[51] Int. Cl.[6] .......................... H01H 85/02; H01H 85/50; H02B 1/26; H02B 1/04

[52] U.S. Cl. .......................... 337/188; 337/201; 337/213; 361/626; 361/642; 361/833

[58] Field of Search .................................... 361/626, 642, 361/646, 833, 837; 337/186, 187, 188, 189, 195, 213

[56] References Cited

U.S. PATENT DOCUMENTS

| | | | |
|---|---|---|---|
| 3,299,236 | 1/1967 | Barker . | |
| 3,354,356 | 11/1967 | Pettit . | |
| 4,052,688 | 10/1977 | DeNigris | 337/213 |
| 5,167,541 | 12/1992 | Alves | 337/186 |

*Primary Examiner*—Leo P. Picard
*Assistant Examiner*—Stephen T. Ryan
*Attorney, Agent, or Firm*—Merchant, Gould, Smith, Edell, Welter & Schmidt, P.A.

[57] ABSTRACT

A fuse box including an insulative bottom shell having a locating block and fixedly mounted with a metal common receptacle, a cover shell covered on the bottom shell and secured thereto by hooks, a plurality of spring supported jacks mounted in respective through holes in the locating block of the bottom shell, a plurality of cartridge fuses respectively connected between the jacks and respective plug holes in the metal common receptacle, a plurality of first electric wire connectors respectively fastened to respective electric wires and then connected to the jacks by a respective screw joint, and a plurality of second electric wire connectors respectively fastened to respective electric wires and then respectively threaded into a respective screw hole in the metal common receptacle.

3 Claims, 6 Drawing Sheets

FUSE BOX

BACKGROUND OF THE INVENTION

The present invention relates to fuse boxes, and more particularly to such a fuse box that is easy to install, and uses less number of screws for fastening.

FIG. 1 shows a fuse box according to the prior art. This structure of fuse box is comprised of a bottom shell 11*a*, a cover shell 10*a* covered on the bottom shell 11*a*, a plurality of fuse clamps 12*a* adapted for holding fuses 16*a*, and a plurality of electric wire connectors 13*a* adapted for holding electric wires. The fuse clamps 12*a* are respectively fastened to the electric wire connectors 13*a* by screws 14*a*, and then the electric wire connectors 13*a* are respectively fastened to the bottom shell 11*a* by screws 15*a*. This installation procedure is complicated, and uses many screws.

SUMMARY OF THE INVENTION

The present invention has been accomplished to provide a fuse box that is easy to install, and uses less number of screws during its installation procedure. According to the preferred embodiment of the present invention, the fuse box comprises a bottom shell having a locating block and fixedly mounted with a metal common receptacle, a cover shell covered on the bottom shell and secured thereto by hooks, a plurality of spring supported jacks mounted in respective through holes in the locating block of the bottom shell, a plurality of cartridge fuses respectively connected between the jacks and respective plug holes in the metal common receptacle, a plurality of first electric wire connectors respectively fastened to respective electric wires and then connected to the jacks by a respective screw joint, and a plurality of second electric wire connectors respectively fastened to respective electric wires and then respectively threaded into a respective screw hole in the metal common receptacle. Each jack is comprised of a connecting element fastened to one first electric wire connector by a screw joint, a socket member fastened to the connecting element by a screw joint and adapted for holding one end of one cartridge fuse, and a spring mounted around the connecting element and stopped between the socket member and the locating block of the bottom shell. The first electric wire connectors and the second electric wire connectors have a respective outside wall embossed, so that they can be positively gripped by fingers.

DETAILED DESCRIPTION OF THE PREFERRED EMBODIMENT

Figure 1:
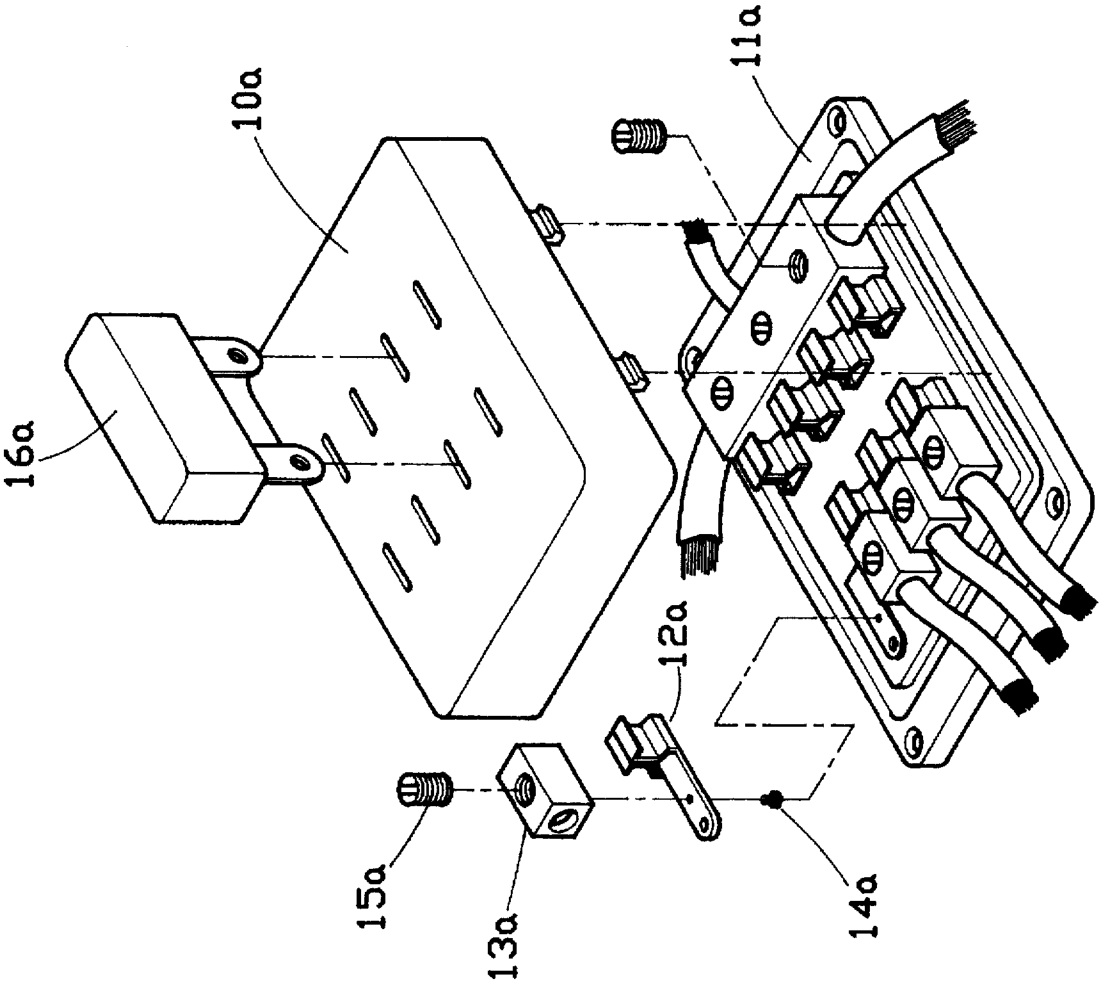
FIG. 1 is an exploded view of a fuse box according to the prior art.
Figure 2:
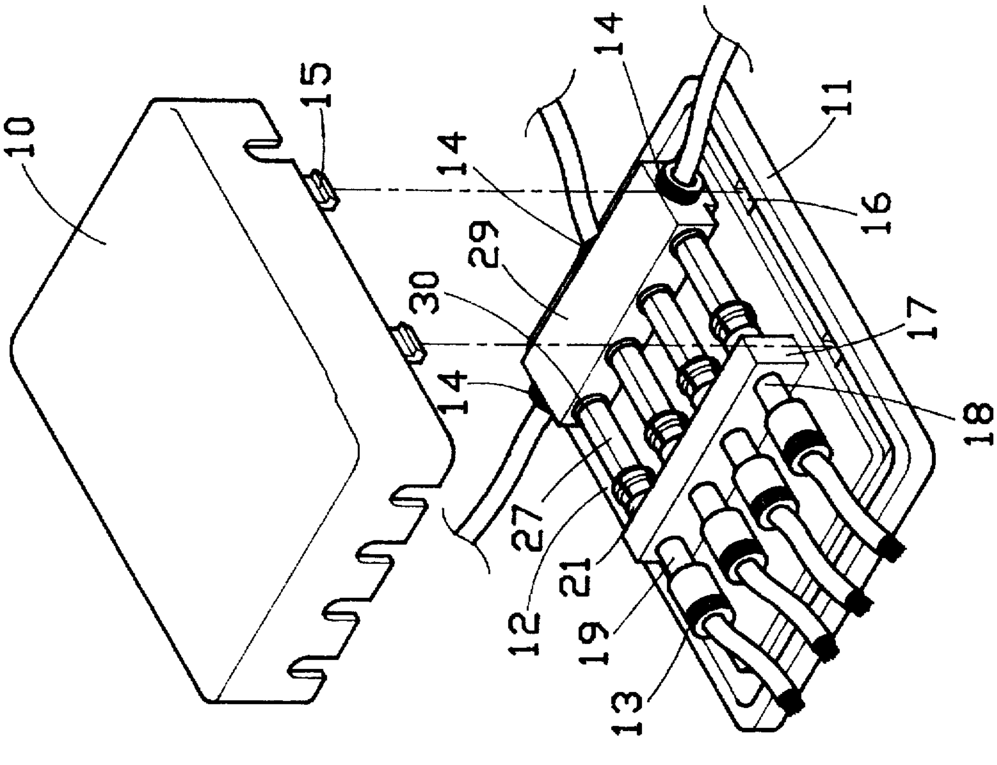
FIG. 2 is an elevational view of the present invention, showing the cover shell opened.
Figure 3:
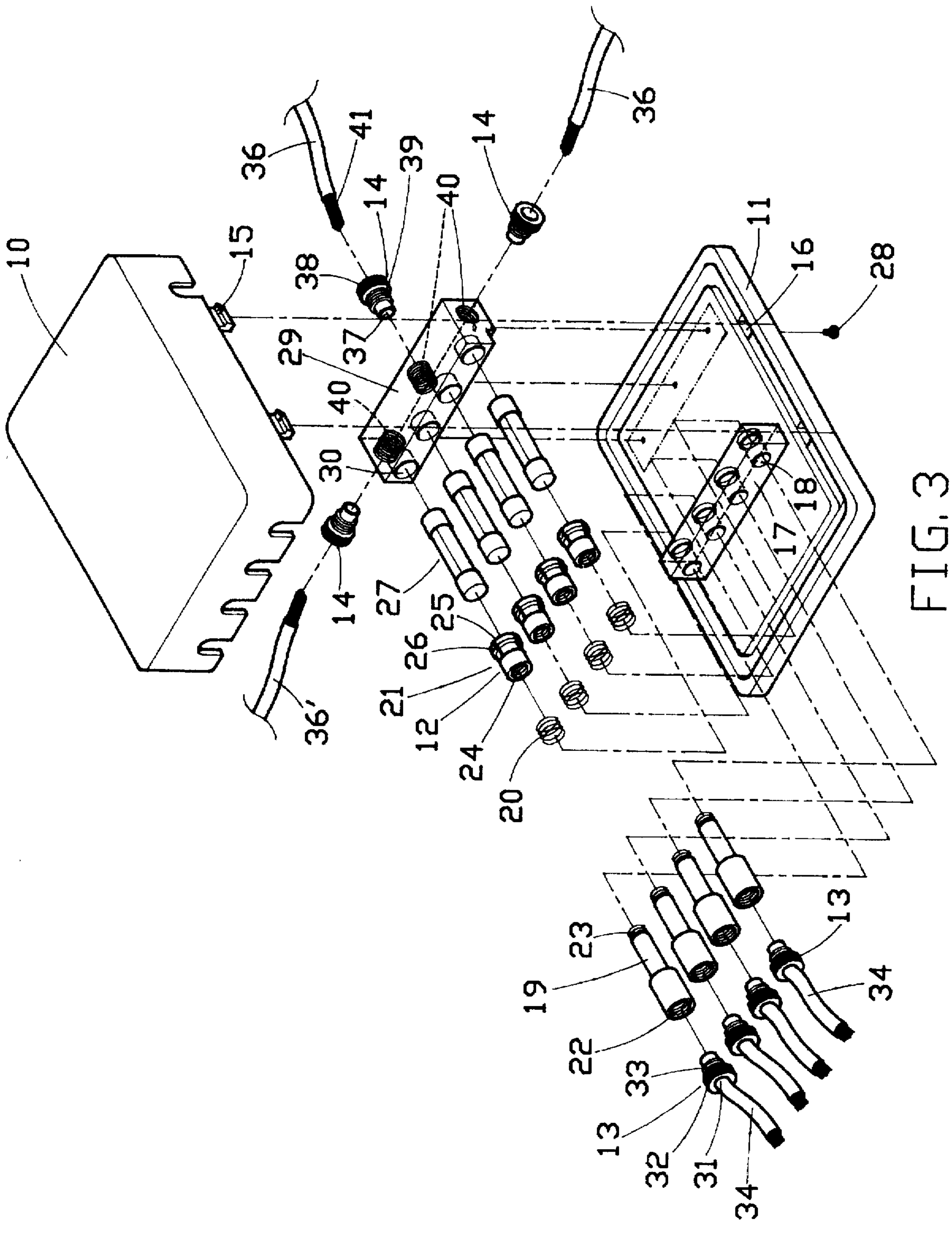
FIG. 3 is an exploded view of the fuse box shown in FIG. 2.
Figure 4:
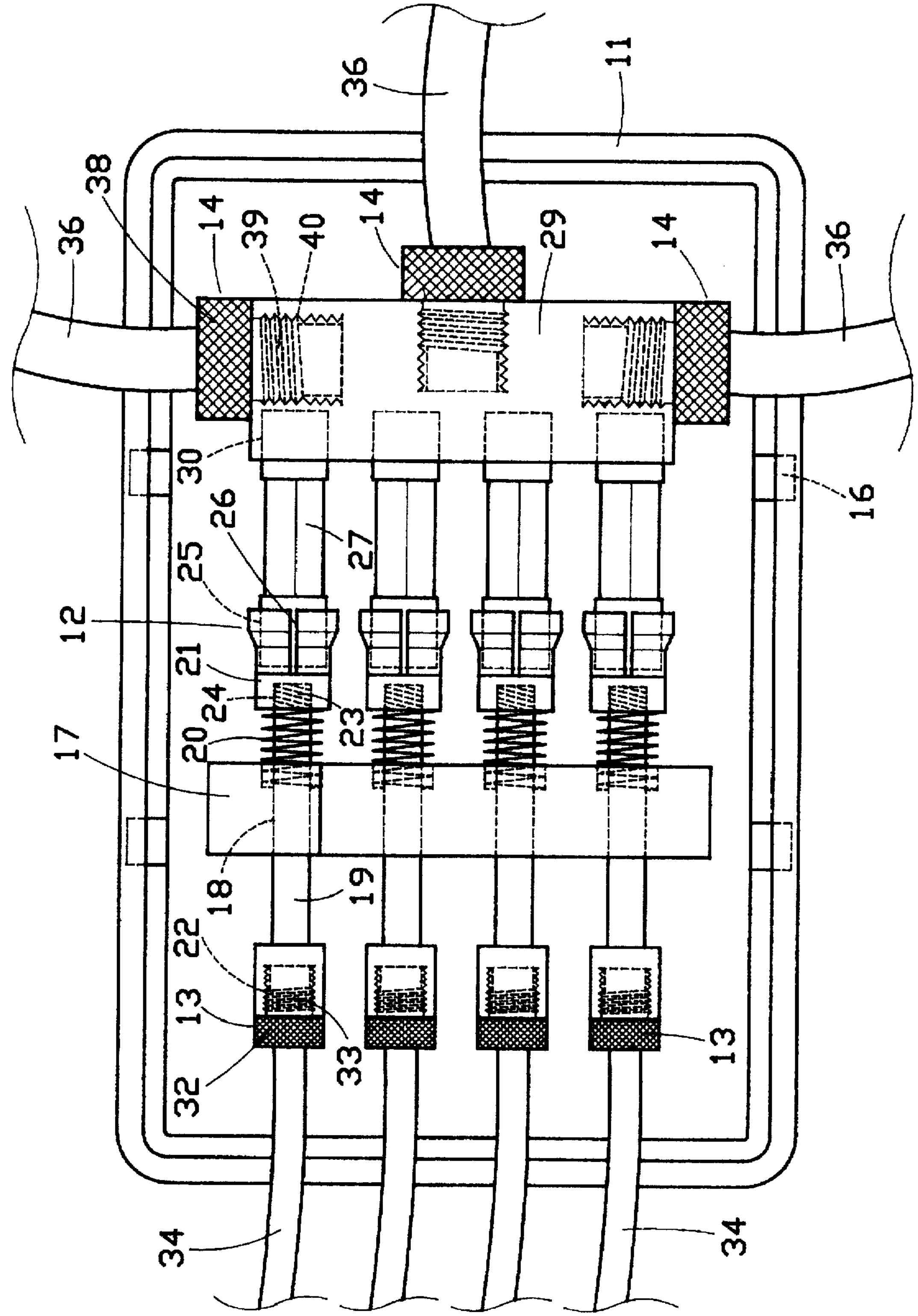
FIG. 4 is a top plain view in an enlarged scale of the fuse box shown in FIG. 2.

Referring to FIGS. from 2 to 5, a fuse box in accordance with the present invention is comprised of a bottom shell 11, a cover shell 10, a plurality of jacks 12, a plurality of first electric wire connectors 13, a plurality of second electric wire connectors 14, a plurality of cartridge fuses 27, and a common receptacle 29.

The bottom shell 11 and the cover shell 10 are respectively made from electrically insulative material. The bottom shell 11 has a plurality of retaining holes 16. The cover shell 10 has a plurality of downward hooks 15 respectively hooked in the retaining holes 16 of the bottom shell 11. The bottom shell 11 further comprises an elongated locating block 17 raised from the top, and a plurality of parallel through holes 18 through the elongated locating block 17.

Each jack 12 is comprised of a connecting element 19, a spring 20, and a socket member 21. The connecting element 19 is made from metal and slidably inserted through one through hole 18 of the locating block 17 of the bottom shell 11, having an inner thread 22 at one end, and an outer thread 23 at an opposite end. The socket member 21 has an inner thread 24 at one end threaded onto the outer thread 23 of the corresponding connecting element 19, a split coupling portion 26 at an opposite end defining a plug hole 25 adapted for receiving one end of one cartridge fuse. 27. The spring 20 is mounted around the connecting element 19, and stopped between the locating block 17 and the socket member 21 of the respective jack 12.

The common receptacle 29 is made from metal and fixedly secured to the bottom shell 1 by screws 28 and disposed in parallel to the locating block 17, having a plurality of parallel plug holes 30 corresponding to the through holes 18 of the locating block 17 and adapted for receiving one end of one cartridge fuse 27, and a plurality of screw holes 40.

The cartridge fuses 27 are respectively connected between the jacks 12 and the metal common receptacle 29, each having one end plugged into the plug hole 25 of one socket member 21, and an opposite end plugged into one plug hole 30 of the metal common receptacle 29. Because the jacks 12 are supported on the locating block 17 by the springs 20, each cartridge fuse 27 can be conveniently disconnected from the socket member 21 of the corresponding jack 12 when the corresponding jack 12 is moved backwards to compress the respective spring 20.

Figure 5:
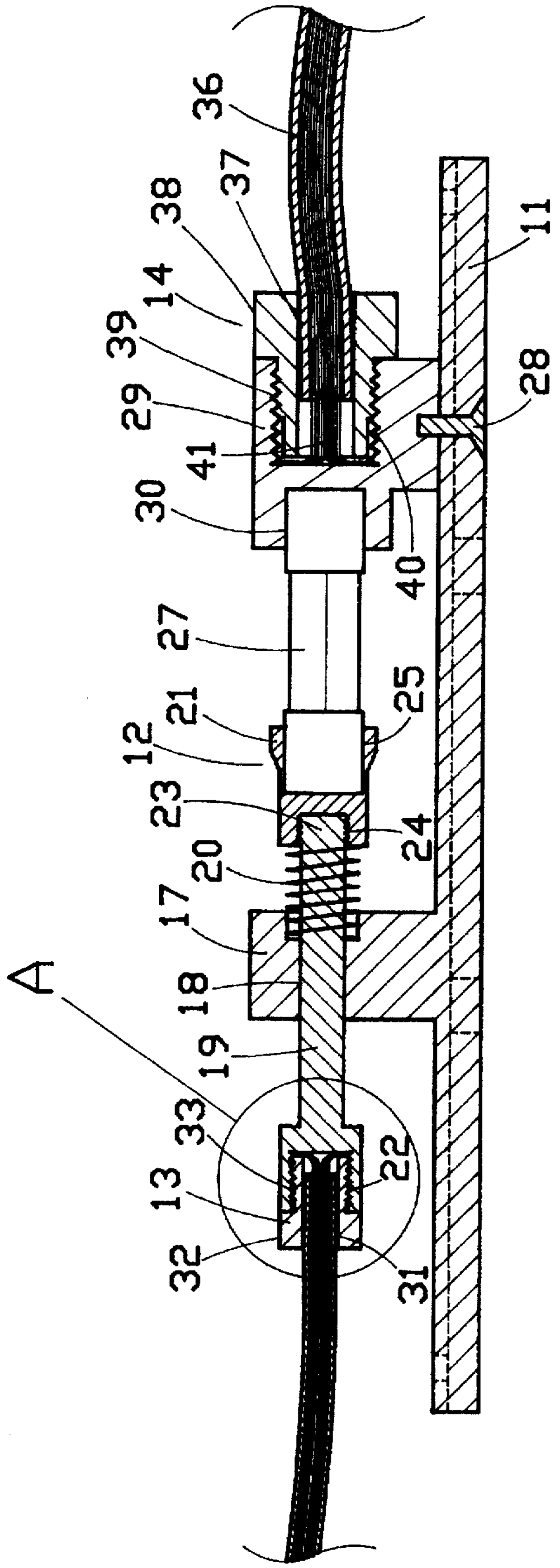
FIG. 5 is a side plain view in an enlarged scale of the fuse box shown in FIG. 2.
Figure 5A:
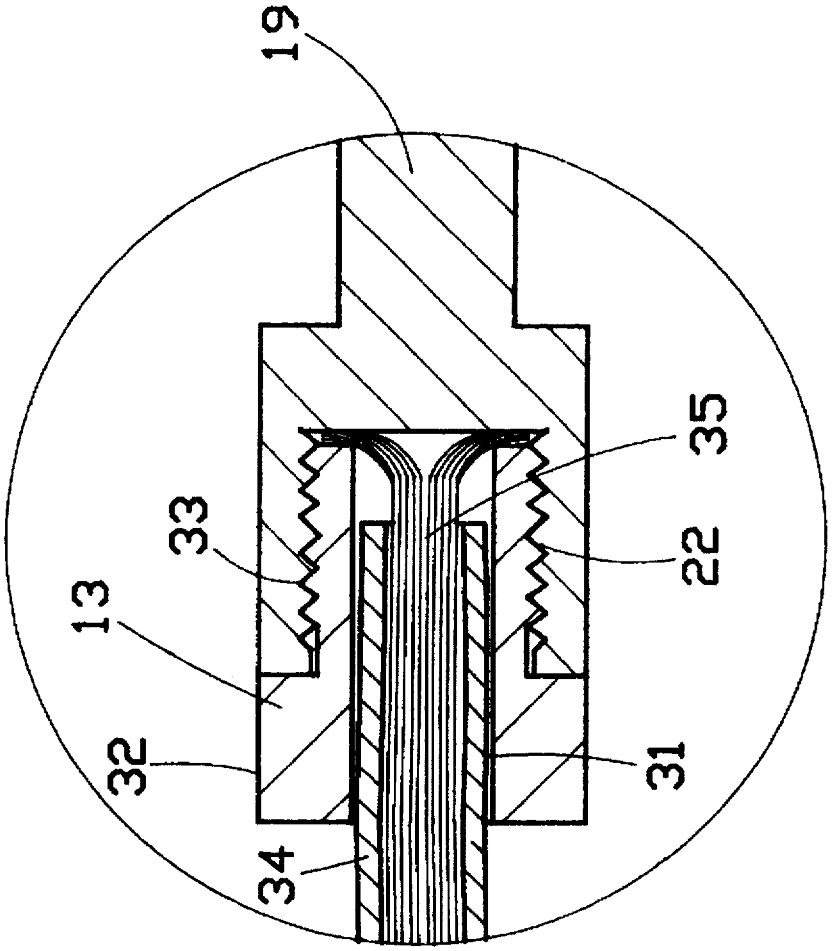
FIG. 5A is an enlarged view of a part of FIG. 5.

The first electric wire connectors 13 are made from metal and respectively fastened to respective electric wires 34, and then connected to the connecting elements 19 of the jacks 12. Each first electric wire connector 13 comprises a center through hole 31, which receives one electric wire 34, an embossed outside wall 32, and an outer thread 33 at one end threaded into the inner thread 22 of the corresponding connecting element 19. When one electric wire 34 is inserted through the center through hole 31 of one first electric wire connector 13, the conductor 35 of the respective electric wire 34 is bent outwards closely attached to the end edge of the respective first electric wire connector 13, and then the outer thread 33 of the respective first electric wire connector 13 is threaded into the inner thread 22 of the respective connecting element 19, permitting the conductor 35 of the respective electric wire 34 to be firmly retained between the outside wall of the respective first electric wire connector 13 and the inside wall of the respective connecting element 19 (see FIGS. 5 and 5A).

The second electric wire connectors 14 are made from metal and respectively fastened to respective electric wires 36, and then connected to the metal common receptacle 29. Each second electric wire connector 14 comprises a center through hole 37, which receives one electric wire 36, an embossed outside wall 38, and an outer thread 39 at one end threaded into one screw hole 40 of the metal common receptacle 29. When one electric wire 36 is inserted through the center through hole 37 of one second electric wire connector 14, the outer thread 39 of the respective second electric wire connector 14 is threaded into one screw hole 40 of the metal common receptacle 29, permitting the conductor 41 of the respective electric wire 36 to be firmly retained between the metal common receptacle 29 and the respective second electric wire connector 14.

When the electric wires 34 and 36 are respectively fastened to the first electric wire connectors 13 and the second electric wire connectors 14, the first electric wire connectors 13 and the second electric wire connectors 14 are respectively connected to the jacks 12 in the through holes 18 of the locating block 17 of the bottom shell 11 and the screw holes 40 of the metal common receptacle 29, and then the cartridge fuses 27 are respectively connected between the plug holes 30 of the metal common receptacle 29 and the socket members 21 of the jacks 12, and then the cover shell 10 is covered on the bottom shell 11 by hooking the downward hooks 15 in the retaining holes 16 respectively.

It is to be understood that the drawings are designed for purposes of illustration only, and are not intended as a definition of the limits and scope of the invention disclosed.

What the invention claimed is:

1. A fuse box comprising:

a box body, said box body comprised of a bottom shell and a cover shell covered on said bottom shell, said bottom shell comprising a locating block raised from a top side thereof, said locating block comprising a plurality of parallel through holes;

a metal common receptacle fixedly fastened to the top side of said bottom shell by screws and disposed in parallel to said locating block, having a plurality of plug holes respectively disposed in alignment with the through holes of said locating block, and a plurality of screw holes;

a plurality of jacks respectively inserted through the through holes of said locating block, each of said jacks comprising a connecting element moved in one through hole of said locating block and having an inner thread at one end and an outer thread at an opposite end, a socket member having an inner thread at one end threaded onto the outer thread of said connecting element and a plug hole at an opposite end, and a spring mounted around said connecting element and stopped between said locating block and said socket member;

a plurality of cartridge fuses respectively connected between the plug holes of the socket members of said jacks and the plug holes of said metal common receptacle;

a plurality of first electric wire connectors adapted for connecting respective electric wires to the connecting elements of said jacks respectively, each of said first electric wire connectors comprising a center through hole which receives the respective electric wire, an embossed outside wall, and an outer thread at one end adapted for threading into the inner thread of one connecting element; and a plurality of second electric wire connectors adapted for connecting respective electric wires to said metal common receptacle, each of said second electric wire connectors comprising a center through hole which receives the respective electric wire, an embossed outside wall, and an outer thread at one end adapted for threading into one screw hole of said metal common receptacle.

2. The fuse box of claim 1 wherein the socket member of each of said jacks has a plurality of longitudinal splits spaced around the respective plug hole.

3. The fuse box of claim 1 wherein said bottom shell comprises a plurality of retaining holes, and said cover shell comprises a plurality of downward hooks respectively hooked in the retaining holes of said bottom shell.

* * * * *